United States Patent
Ono

(10) Patent No.: US 6,992,955 B2
(45) Date of Patent: Jan. 31, 2006

(54) OPTICAL DISC REPRODUCING APPARATUS AND TRACKING SERVO MECHANISM FOR AN OPTICAL DISC

(75) Inventor: Takayuki Ono, Osaka (JP)

(73) Assignee: Funai Electric Co., Ltd, Osaka (JP)

( * ) Notice: Subject to any disclaimer, the term of this patent is extended or adjusted under 35 U.S.C. 154(b) by 640 days.

(21) Appl. No.: 10/195,433

(22) Filed: Jul. 16, 2002

(65) Prior Publication Data

US 2003/0048707 A1     Mar. 13, 2003

(30) Foreign Application Priority Data

Jul. 24, 2001   (JP)   ............ P.2001-223230

(51) Int. Cl.
*G11B 7/00*   (2006.01)

(52) U.S. Cl. ............... 369/44.41; 369/44.37; 369/44.29; 369/44.35

(58) Field of Classification Search ............ 369/44.27, 369/44.28, 44.29, 44.32, 44.33, 44.34, 44.25, 369/44.35, 44.37, 44.41, 47.1, 47.14, 53.1, 369/53.12, 53.13, 53.14, 53.15, 53.16, 53.17, 369/53.18, 53.19, 53.23
See application file for complete search history.

(56) References Cited

U.S. PATENT DOCUMENTS 6,819,638 B1 *  11/2004  Sakamoto et al. ........ 369/44.32

FOREIGN PATENT DOCUMENTS

JP        8-55351       2/1996

* cited by examiner

*Primary Examiner*—Muhammad Edun
(74) *Attorney, Agent, or Firm*—Morgan, Lewis & Bockius LLP

(57) ABSTRACT

At a timing when a spot M of a main beam enters a defective area N of an optical disc, the tracking servo control is stopped, and the position the spot M of the main beam is held to the current position with respect to a radial direction of the optical disc, and, after a spot S2 of a rear sub-beam then exits the defective area N, the tracking servo control is resumed.

1 Claim, 4 Drawing Sheets

US 6,992,955 B2

OPTICAL DISC REPRODUCING APPARATUS AND TRACKING SERVO MECHANISM FOR AN OPTICAL DISC

BACKGROUND OF THE INVENTION

The present invention relates to an optical disc reproducing apparatus which reproduces data from an optical disc such as a CD or a DVD, and also to a tracking servo mechanism for an optical disc which performs a tracking servo control on an optical disc.

In a tracking servo mechanism for an optical disc of the three-beam method, as shown in FIG. 5, in addition to a spot M of a main beam for reading data from an optical disc, a spot S1 of a front sub-beam which impinges in front of the main beam with respect to the track direction of the optical disc, and a spot S2 of a rear sub-beam which impinges in rear of the main beam with respect to the track direction of the optical disc irradiate an optical disc. The difference between output signals of optical sensors which receive respectively reflected light beams of the front and rear sub-beams from the optical disc is used as a tracking error signal.

When the spot M of the main beam is positioned in the center of a track T of an optical disc as shown in FIG. 5B, the intensities of the reflected light beams of the spots S1 and S2 of the front and rear sub-beams from the optical disc are equal to each other. By contrast, when the spot M of the main beam is not positioned in the center of the track T of the optical disc as shown in FIGS. 5A and 5C, the intensities of the reflected light beams of the spots S1 and S2 of the front and rear sub-beams from the optical disc are differentiated from each other. A tracking servo control is performed by using this phenomenon.

In an optical disc, there is a possibility that a defective area due to a scratch or dirt exists. In such a defective area, the intensity of a reflected light beam from the optical disc may have an unexpected value to cause track slipping (the spot of the main beam is moved to another track), and hence the tracking servo control is stopped. A specific process relating to the above will be described.

As shown in FIG. 2, four output signals A, B, C, and D of a four-split photodiode 11 which receives a reflected light beam of the main beam from the optical disc are added together by an adder 21, and a resulting signal is passed through a low-pass filter 22, whereby a full adding signal ASO is produced. The value of the full adding signal ASO varies in accordance with the relationship between a defective area N of the optical disc and the center position of the spot of the main beam, as shown in, for example, FIG. 6. In this example, when the level of the full adding signal ASO becomes higher than a threshold th, therefore, it is judged that the spot enters the defective area N, and the tracking servo control is turned OFF. When the level of the full adding signal ASO then becomes lower than the threshold th, it is judged that the spot exits the defective area N, and the tracking servo control is turned ON.

In the above-mentioned process, as shown in FIG. 7, the tracking servo control is resumed during a period when the spot S2 of the rear sub-beam is positioned in the defective area N of the optical disc. Therefore, there remains the possibility of occurrence of track slipping.

The Unexamined Japanese Patent Application Publication No. Hei 8-55351 discloses a technique whose objective of which is to prevent track slipping due to a defective area from occurring. In the technique, the tracking servo control remains to be turned ON also during a period when a beam spot is positioned in a defective area, and therefore there is a possibility that track slipping cannot be prevented from occurring.

SUMMARY OF THE INVENTION

It is an object of the invention to provide a tracking servo mechanism for an optical disc which is a tracking servo mechanism for an optical disc of the three-beam method, and in which track slipping due to resumption of the tracking servo control at the timing when a spot of a main beam exits a defective area of an optical disc can be prevented from occurring.

In order to attain the object, the invention provides a tracking servo mechanism for an optical disc in which a tracking error is detected by using a reflected light beam of a front sub-beam from an optical disc, and a reflected light beam of a rear sub-beam from the optical disc, and a tracking servo control is then performed, the front sub-beam impinging in front of a main beam irradiating the optical disc in order to read data from the optical disc, with respect to a track direction of the optical disc, the rear sub-beam impinging in rear of the main beam with respect to the track direction of the optical disc, wherein, at a timing when it is judged that an irradiation position of the main beam enters a defective area of the optical disc, the tracking servo control is stopped, and a spot position of the main beam is held to a current position with respect to a radial direction of the optical disc, and, at or after a timing when it is then judged that a spot of the rear sub-beam exits the defective area, the tracking servo control is resumed.

According to the configuration, the tracking servo control is resumed not during a period when a tracking error signal is caused to be in an abnormal state by a defective area of an optical disc, but after the tracking error signal becomes unaffected by the defective area to be returned to its normal state.

In the case where the tracking servo control is to be resumed at or after the timing when it is judged that the spot of the rear sub-beam exits the defective area, the tracking servo control may be resumed when a time period required from exit of a spot of the main beam from the defective area to exit of the rear sub-beam from the defective area elapses after it is judged that the spot of the main beam exits the defective area.

The spot of the main beam may be judged whether the spot is positioned in the defective area or not, based on the reflected light beam of the main beam from the optical disc.

DETAILED DESCRIPTION OF THE PREFERRED EMBODIMENTS

Hereinafter, an embodiment of the invention will be described with reference to the accompanying drawings.

Figure 1:
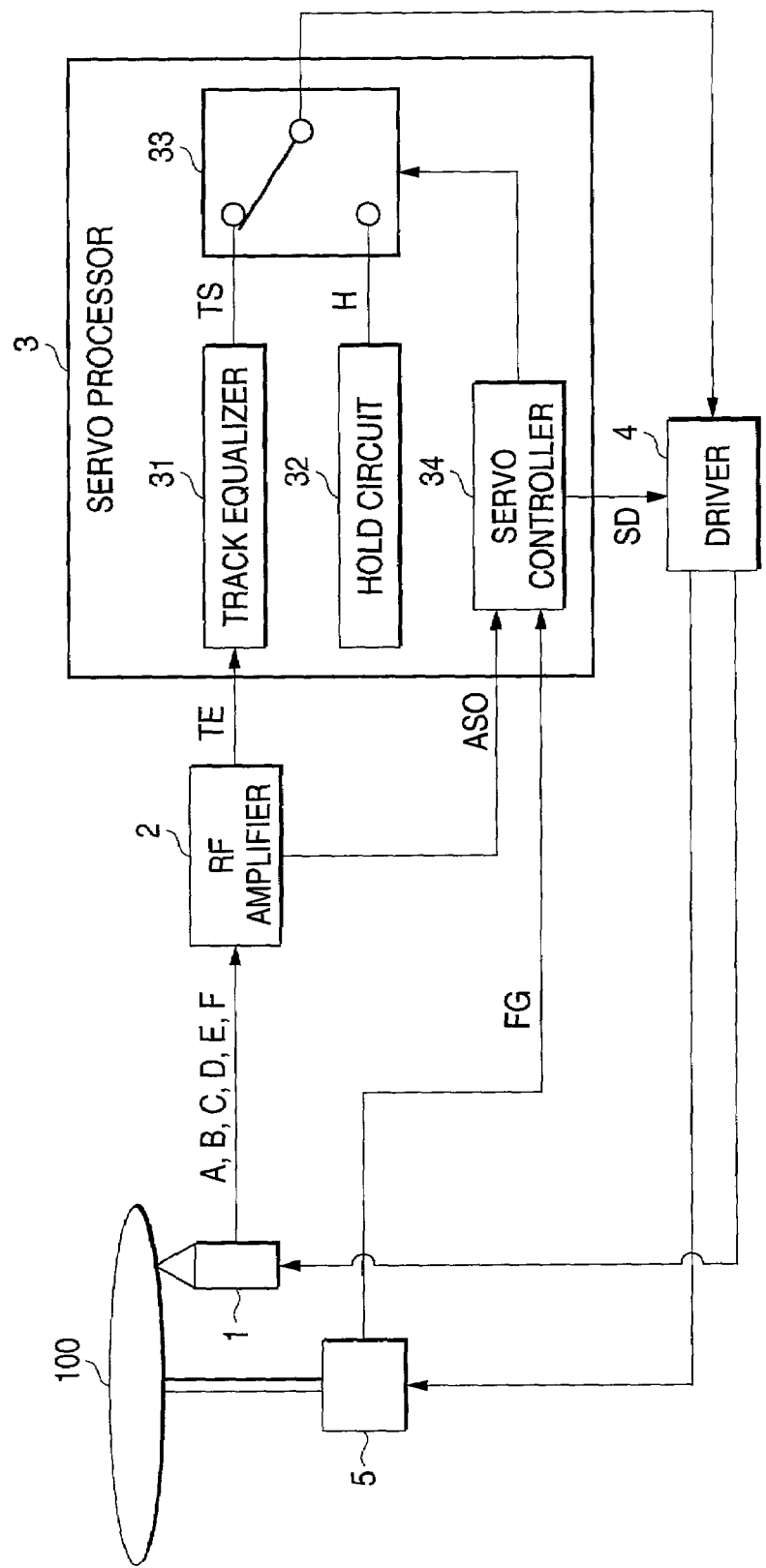
FIG. 1 is a block diagram of an optical disc reproducing apparatus of an embodiment of the invention.

FIG. 1 is a block diagram of an optical disc reproducing apparatus of an embodiment of the invention and showing the configuration of only portions relating to the invention. An optical pickup 1 irradiates an optical disc 100 with a main beam, a front sub-beam, and a rear sub-beam, and receives reflected light beams of the beams from the optical disc 100 to convert the beams into electric signals. The optical pickup 1 incorporates a tracking actuator which moves an objective lens in a radial direction of the optical disc. The objective lens has functions of imaging the main beam, the front sub-beam, and the rear sub-beam as spots on the optical disc, and collecting reflected beams that are scattered and diffracted by the optical disc.

Figure 2:
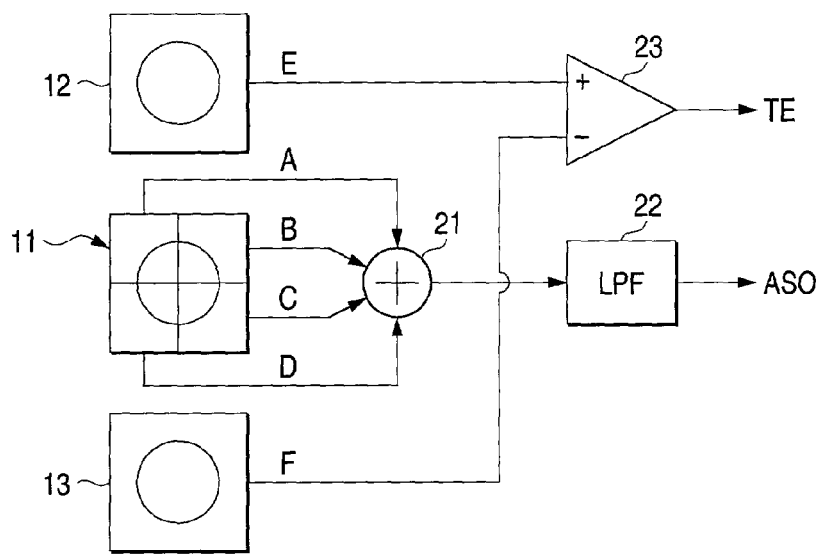
FIG. 2 is a diagram illustrating a full adding signal and a tracking error signal which are produced in an RF amplifier.

As shown in FIG. 2, an RF amplifier 2 has an adder 21 and a low-pass filter 22. Four output signals A, B, C, and D of a four-split photodiode 11 which is in the optical pickup 1, and which receives the reflected light beam of the main beam are added together by the adder 21, and a resulting signal is passed through the low-pass filter 22, whereby a full adding signal ASO is produced. The RF amplifier 2 has also a differential amplifier 23 which produces a tracking error signal TE that is the difference between signals E and F output from photodiodes 12 and 13 (in the optical pickup 1) for receiving reflected light beams of the front and rear sub-beams, respectively.

A servo processor 3 has a track equalizer 31, a hold circuit 32, a switch 33, and a CPU 34. The track equalizer 31 removes waveform distortion of the tracking error signal TE which is produced in the RF amplifier 2, and adjusts the frequency characteristics, thereby producing a tracking servo signal Ts for causing the spot of the main beam to follow a track.

The hold circuit 32 outputs a hold signal H for holding the spot position of the main beam to the current position with respect to a radial direction of the optical disc 100. The switch 33 performs switching in which either of the tracking servo signal TS and the hold signal H is supplied to a driver 4 that will be described later.

The servo controller 34 produces a spindle drive signal SD for adjusting the rotation number of a spindle motor 5 for rotating the optical disc 100 to a target value, on the basis of a rotation detecting signal FG which is supplied from the spindle motor 5, and which indicates the rotation number of the spindle motor 5. The servo controller supplies the spindle drive signal to the driver 4, and switches over the switch 33 on the basis of the full adding signal ASO supplied from the RF amplifier 2.

The driver 4 drives the spindle motor 5 on the basis of the spindle drive signal SD, and also the tracking actuator in the optical pickup 1 on the basis of the tracking drive signal. The tracking servo signal TS or the hold signal H is supplied as the tracking drive signal from the servo processor 3 to the driver 4.

Figure 3:
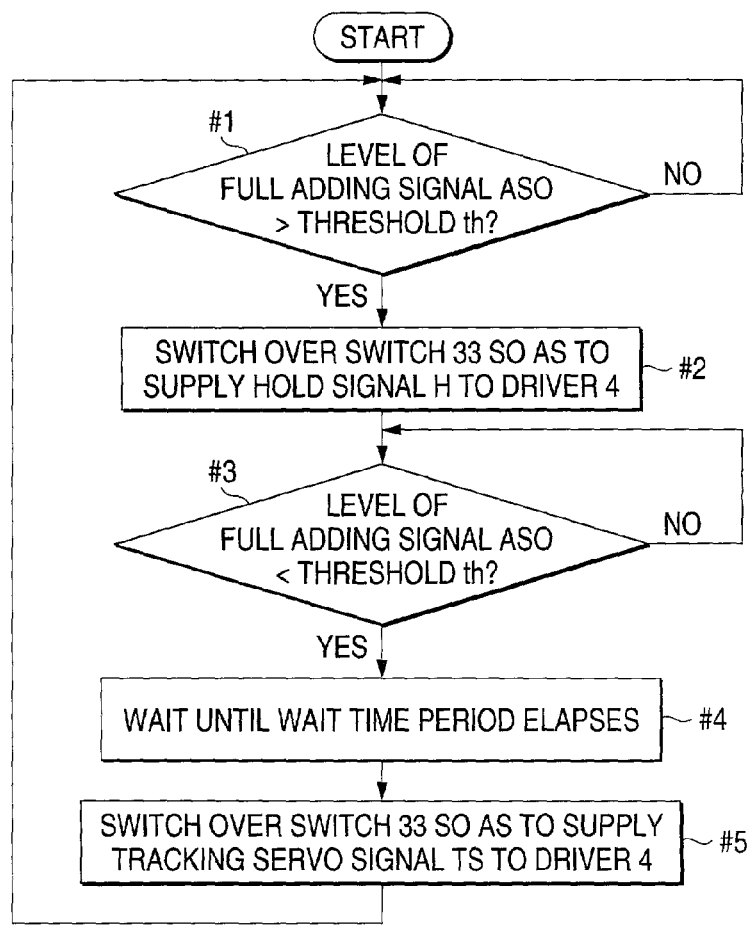
FIG. 3 is a flowchart showing operations which are conducted by a servo controller on the basis of the full adding signal supplied from the RF amplifier.

Hereinafter, operations which are conducted by the CPU 34 in the servo processor 3 on the basis of the full adding signal ASO supplied from the RF amplifier 2 will be described with reference to the flowchart shown in FIG. 3. It is assumed that the value of the full adding signal ASO varies in accordance with the relationship between a defective area of the optical disc 100 and the center position of the spot of the main beam, as shown in FIG. 6.

Figure 6:
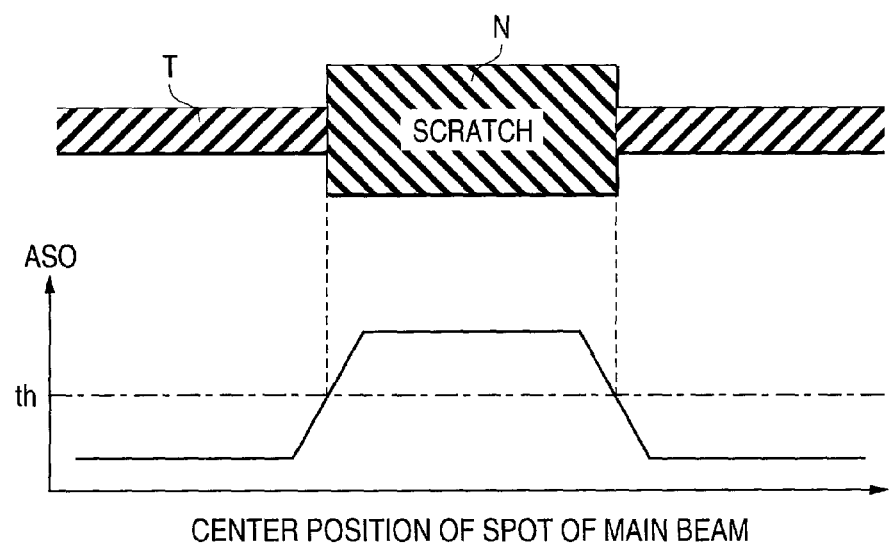
FIG. 6 is a diagram showing an example of a manner in which the value of a full adding signal ASO varies in accordance with the relationship between a defective area N of the optical disc and the center position of the spot of the main beam.

When the value of the full adding signal ASO becomes higher than the threshold th in FIG. 6 (Yes in step #1), it is judged that the spot of the main beam enters the defective area of the optical disc 100, and the switch 33 is switched over so that the hold signal H output from the hold circuit 32 is supplied as the tracking drive signal to the driver 4 (#2).

When the value of the full adding signal ASO then becomes lower than the threshold th in FIG. 6 (Yes in step #3), it is judged that the spot of the main beam exits the defective area of the optical disc 100, and the control then waits until a wait time period elapses (#4). Thereafter, the switch 33 is switched over so that the tracking servo signal TS output from the track equalizer 31 is supplied as the tracking drive signal to the driver 4 (#5). When step #5 is ended, the control is transferred to above-mentioned step #1.

When the distance between the main beam and the rear sub-beam is L and the linear velocity of the optical disc is V, the wait time period W in step #4 is expressed by:

$$W = L \div V.$$

As a result of the above process, when the spot of the main beam enters the defective area of the optical disc 100, the tracking servo control is turned OFF, and the spot position of the main beam is held to the current position with respect to a radial direction of the optical disc 100. At the timing when the rear sub-beam then exits the defective area of the optical disc 100, the tracking servo control is turned ON.

Figure 4:
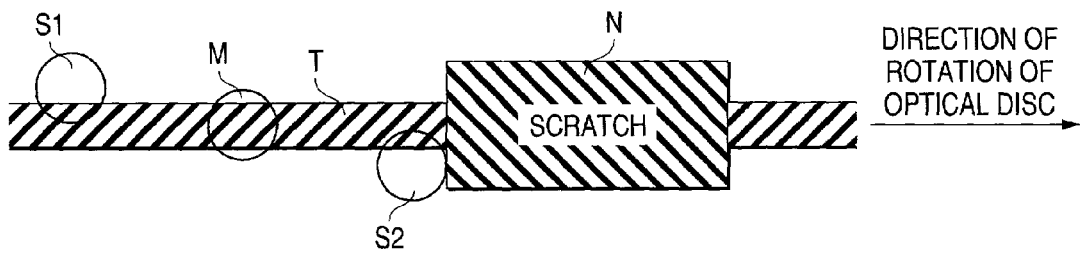
FIG. 4 is a diagram showing positional relationships between beam spots and a defective area when a spot of a main beam exits a defective area of an optical disc and the tracking servo control is resumed in the embodiment.
Figure 5A:
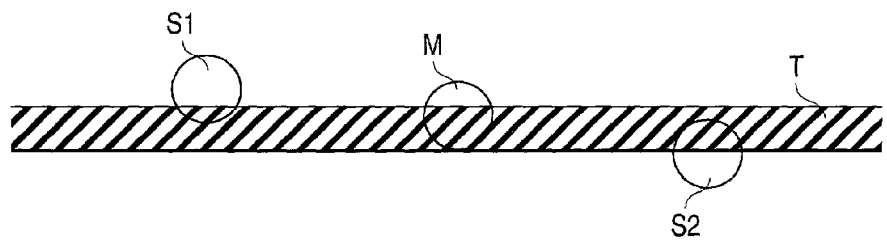
FIG. 5 is a diagram illustrating a tracking servo mechanism for an optical disc of the three-beam method.
Figure 5B:
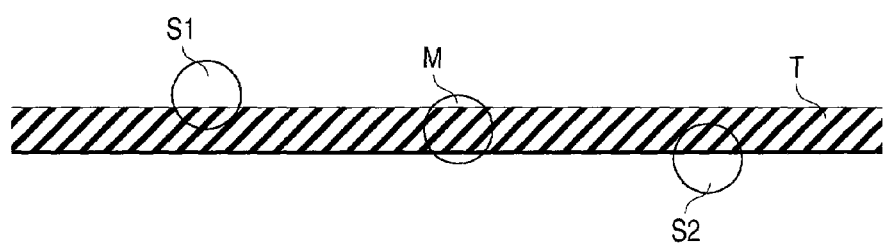
Figure 5C:
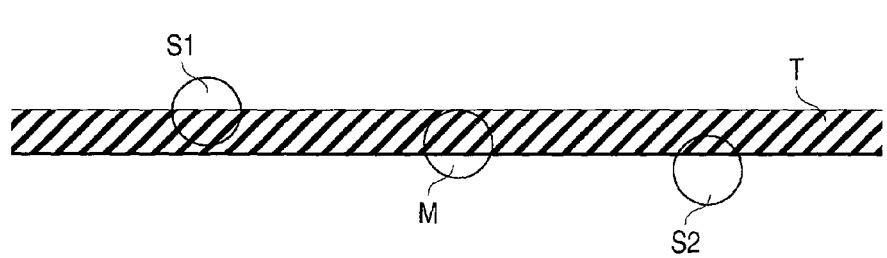
Figure 7:
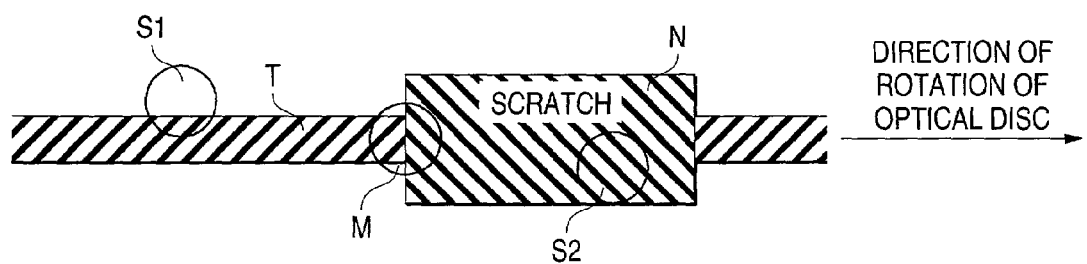
FIG. 7 is a diagram showing positional relationships between beam spots and a defective area when a spot of a main beam exits a defective area of an optical disc and the tracking servo control is resumed in the conventional art.

In the embodiment, as described above, the tracking servo control is resumed, not at the timing when the spot M of the main beam exits the defective area N of the optical disc as shown in FIG. 7, but at the timing when the spot S2 of the rear sub-beam exits the defective area N of the optical disc as shown in FIG. 4. Therefore, it is possible to prevent track slipping due to resumption of the tracking servo control at the timing when the spot of the main beam exits the defective area of the optical disc, from occurring.

In the case where the rotation of the optical disc is CAV-controlled, the linear velocity varies depending on the position of the spot of the main beam in a radial direction of the optical disc. Therefore, the wait time period may be set by substituting the current linear velocity in the above expression each time when it is judged that the spot of the main beam exits a defective area of the optical disc. Alternatively, a constant wait time period which is obtained by substituting the highest linear velocity (i.e., the linear velocity at the outermost periphery) in the above expression may be set irrespective of the current position of the spot. In the latter case, depending on the spot position of the beam, the tracking servo control may be resumed after the spot of the rear sub-beam exits a defective area of the optical disc. In the case of the CLV control, the linear velocity is constant irrespective of the position of the spot of the main beam in a radial direction of the optical disc. Therefore, a constant wait time period is inevitably set.

As described above, according to the invention, in a tracking servo mechanism for an optical disc of the three-beam method, track slipping due to resumption of the tracking servo control at the timing when a spot of a main beam exits a defective area of an optical disc can be prevented from occurring.

What is claimed is:

1. An optical disc reproducing apparatus which reproduces data recorded on an optical disc, comprising:

a unit for irradiating an optical disc with a main beam for reading data, a front sub-beam which impinges in front of the main beam with respect to a track direction of said optical disc, and a rear sub-beam which impinges in rear of the main beam with respect to the track direction of said optical disc;

a first optical sensor which converts a reflected light beam of the main beam from said optical disc, into an electric signal;

a second optical sensor which converts a reflected light beam of the front sub-beam from said optical disc, into an electric signal;

a third optical sensor which converts a reflected light beam of the rear sub-beam from said optical disc, into an electric signal;

a unit for producing a tracking error signal which is a difference between a signal obtained by said second optical sensor and a signal obtained by said third optical sensor;

a unit for, on the basis of the tracking error signal, producing a tracking servo signal for causing a spot position of the main beam to follow a track of said optical disc;

a unit for producing a hold signal for holding the spot position of the main beam to a current position with respect to a radial direction of said optical disc;

a moving unit for, on the basis of a supplied track drive signal, moving the spot position of the main beam in a radial direction of said optical disc;

a switching unit for performing switching in which either of the tracking servo signal and the hold signal is supplied as the track drive signal to said moving unit;

a low-pass filter which allows only low-frequency components of the electric signal obtained by said first optical sensor, to pass through said low-pass filter; and a tracking servo ON/OFF controlling unit for, on the basis of a level of a signal output from said low-pass filter, judging whether a spot of the main beam is positioned in a defective area of said optical disc or not, for, at a timing when it is judged that the spot of the main beam enters the defective area, switching the signal supplied as the track drive signal to said moving unit, to the hold signal by using said switching unit, and for, when a wait time period elapses after a timing when it is judged that the spot of the main beam exits the defective area, switching the signal supplied as the track drive signal to said moving unit, to the tracking servo signal by using said switching unit, and the wait time period is equal to a value which is obtained by dividing a distance between the main beam and the rear sub-beam by a linear velocity of said optical disc.

\* \* \* \* \*